Figure 1:
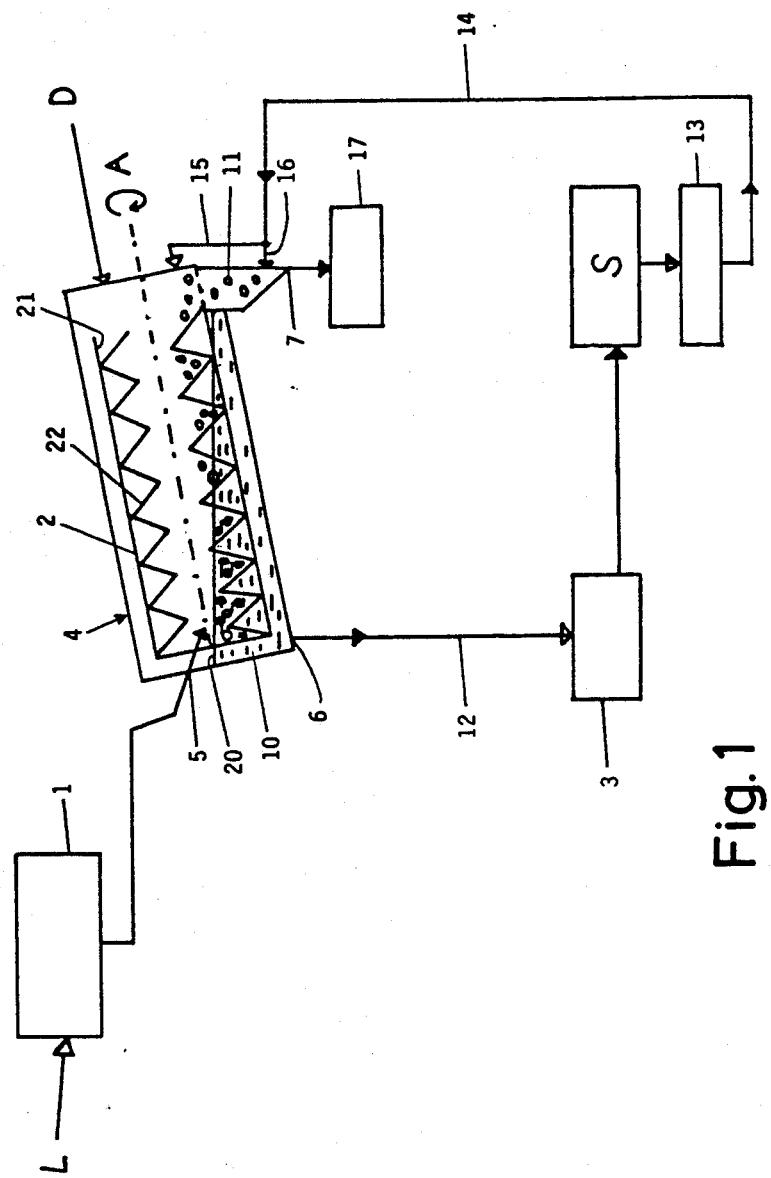

United States Patent [19]

Kohlbach

[11] Patent Number: 4,921,719
[45] Date of Patent: May 1, 1990

[54] METHOD AND APPARATUS FOR THE CONTINUOUS PRESERVATION OF LUMPY PRODUCTS SUCH AS FOOD PRODUCT IN LUMP FORM

[75] Inventor: Friedrich R. Kohlbach, Greifenberg, Fed. Rep. of Germany

[73] Assignee: Bowater Packaging Limited, London, England

[21] Appl. No.: 205,430

[22] Filed: Jun. 10, 1988

[30] Foreign Application Priority Data

Jun. 11, 1987 [DE] Fed. Rep. of Germany ....... 3719526

[51] Int. Cl.$^5$ .......................... A23L 3/16; B01F 15/02
[52] U.S. Cl. ..................................... 426/521; 99/470; 99/483; 99/517; 426/511; 426/524
[58] Field of Search ............... 426/509, 521, 524, 399, 426/511; 99/470, 483, 348, 443 R, 517

[56] References Cited

U.S. PATENT DOCUMENTS

| | | | |
|---|---|---|---|
| 4,214,013 | 7/1980 | Hirahara | 426/509 |
| 4,306,493 | 12/1981 | Hain et al. | 99/517 |
| 4,361,083 | 11/1982 | Natusch | 99/483 |
| 4,547,383 | 10/1985 | Goldhahn | 426/524 |

Primary Examiner—George Yeung
Attorney, Agent, or Firm—Cumpston & Shaw

[57] ABSTRACT

Method and apparatus for the continuous preservation of lumpy product in which the lumpy product is blanched, pasteurized or sterilized and then packaged hot or cooled, under aseptic conditions. In order to treat the lumpy product, e.g. chucks of fruit, in the gentlest possible manner, the heat treated product is continuously passed, without using pressure, to a drum (4) having a conveyor (2) therein through which a pasteurized liquid (10) is continuously circulated, the liquid (10) also being fed to the drum separate from the product under aseptic conditions, and having its level inside the drum maintained at a constant pre-selected value with excess liquid (10) being drawn off and re-sterilized for return to the drum (4), and the lumpy product inside the drum being continuously separated from the liquid by movement of the product through the drum by the conveyor (2), which is preferably in the form of a sieve insert with internal spiral rotatable within the drum (4) which is inclined.

19 Claims, 2 Drawing Sheets

METHOD AND APPARATUS FOR THE CONTINUOUS PRESERVATION OF LUMPY PRODUCTS SUCH AS FOOD PRODUCT IN LUMP FORM

The invention relates to a method and apparatus for the continuous preservation of product in lump form such as food product (hereinafter called lumpy product) in which the whole or chopped lumpy product is blanched, heat-treated and packed, hot or cold, under aseptic conditions using a blanching and sterilising device and at least one other device for the heat treatment of the lumpy product.

The invention is particularly designed for the aseptic packaging of particles of fruit, such as half peaches, pineapple chunks and other delicate fruit, and of vegetables, such as carrots, potatoes, mushrooms and the like. It can, however, be used for aseptically packaging many other lumpy products, such as other foodstuffs, chemicals and pharmaceuticals, and the like. In the past, it has proved extremely difficult aseptically to package in large containers, on a continuous basis, lumpy products, e.g. particulate food products in lump form (except for example in cans up to about 5Kg. size). The present invention seeks to achieve this, and is particularly suited for "bag-in-box" packaging of fruit chunks, including the packaging of such lumpy product in bags in 200 liter drums.

A discontinuous process for sterilising lumpy food is described in Patent DE-PS-2829381. In this process, a batch of the goods to be sterilised is steam heated in a rotating tumbler vessel, whereupon the sterilised products are removed from the vessel under sterile conditions. To maintain the integrity of the lumpy food and to accelerate the passage of heat through the product, the quantity of liquid (juice, water, gravy, sauce or the like) added initially, is small compared with the total amount required in this known process, most of the liquid being added after the solid components start to soften because of the heat applied.

Like all batch processes, this one also has the drawback that the throughput of lumpy product is limited because of the time taken to load the tumbler vessel, to heat the product to sterilisation temperature and then cool it, and to free to the required extent the atmosphere in the vessel from undesirable gases. The main disadvantage is that continuous aseptic control of a discontinuous process is impossible because of the intermittent opening and closing of the sterilisation vessel.

A continuous process and apparatus for pasteurisation, i.e. for the heat treatment (at a maximum temperature of 90°-100°) of lumpy food are described in Patent DE-OS-2952544. In this process the lumpy food is fed to an inclined, steam fed tube containing a conveyor worm that passes the goods continuously from the lower feed end to the higher discharge end. Separately, the liquid to be mixed with the food is heated to the required temperature and is introduced into the tube near the discharge end, this area being designed as a mixing chamber.

This continuous process is not suitable for the heat treatment of very delicate foods, e.g. peaches, pears, pineapples and such like, because the relative movement between the rotating conveyor worm and the tube results in considerable friction and squeezing of the product and hence to mechanical damage. Moreover, the lumpy food components are pressed tightly against each other by the conveyor worm, making the passage of heat through the individual pieces extremely difficult and, in particular, rendering them non-homogeneous. Depending on where the individual pieces come to rest, only some of the product is heated to the required pasteurising temperature, the remainder being pasteurised only on the surface, with the result that aseptic packaging cannot be achieved.

A continuous method for the sterilisation of lumpy food is described in US-A-4181072. The lumpy product is passed continuously through a pressure-tight sluice-type feed into a horizontal tubular non-rotating autoclave which is completely filled with a cooking liquid (sauce) so that the solid components are dispersed, in the form of discrete particles, in the liquid. A conveyor worm moves the liquid and solid particles under the pressure of superheated steam from the feed end to the discharge end where another pressure tight exit sluice is provided. The liquid is continuously removed from the autoclave, sterilised and returned to the autoclave.

Because of the relative movement between the conveyor screw and the autoclave and the pressure within it, mechanical damage to the lumpy components due to friction and squeezing occurs. Another drawback of this process is that the degree of distribution of the solid components in the liquid plays a critical part as regards the effectiveness of the process, so that the ratio of the lumpy food to the liquid used as the heat transfer medium must be kept almost constant, regardless of the goods to be treated, i.e. the ratio cannot be varied within wide limits or adjusted for various goods.

In EP-B-0003721, a method and apparatus is proposed for quickly blanching and sterilising lumpy food products, wherein the products are moved through a pressurised, downwardly inclined vibro-tube or spiral conveyor incorporating a fluidised bed, their outer surface only being flash heated by steam or gas; the products are then moved to a subsequent chamber where they are maintained under adiabatic conditions until the products attain the sterilising temperature throughout. This system is a pressurised system requiring two treatment vessels just for sterilisation, and has not been used commercially, suggesting that aseptic packaging cannot be achieved with it in a commercially acceptable manner.

In FR-A-2400840, a method and apparatus for treating vegetable tubers and fruits is disclosed, to make them resistant to rot and disease. There is a disclosure of a horizontal treatment vessel into which the product to be treated is conveyed, and then moved through the vessel by a spiral conveyor while immersed in a cold treatment liquid, which is continuously replenished. The apparatus merely soaks the product, and is wholly unsuitable for use in an aseptic packaging process.

The present invention seeks to provide a continuous process and an apparatus for carrying out such a process so that the lumpy product can be pasteurised or sterilised and cooled, in a manner which avoids mechanical damage as far as possible, but also eliminates the possibility of thermal damage to the product. The process and apparatus enable continuous heat treatment of particularly sensitive lumpy product which, until now, could only be sterilised using an autoclave. The invention is particularly suitable for delicate fruits and vegetables such as peaches, pears, pineapples, tomato pieces, beans, mushrooms, but also for farinaceous goods such as ravioli or similar food, and other lumpy product.

According to the present invention, we provide a method for the continuous preservation of lumpy product in which the lumpy product is heat treated and subsequently packaged, characterised in that the lumpy product is fed without pressure and under aseptic conditions into a drum which is partially filled with a liquid which is maintained at a constant, adjustable level, and wherein the lumpy product is continuously conveyed through said liquid, separated from the liquid, and passed to a product outlet in the drum for said subsequent packaging, excess liquid in the drum being continuously taken from the drum, pasteurised or sterilised, preferably cooled, and passed back into the drum under aseptic conditions.

According to another aspect of the present invention, we provide liquid nitrogen indirectly to cool hot liquid, said nitrogen being converted by the heat of the liquid into nitrogen gas which is injected, i.e. sparged, into the cooled liquid, and partially absorbed by the liquid, which is subsequently used as a cooling medium for lumpy product in a cooling vessel, heat from the lumpy product to be cooled causing nitrogen injected into the liquid to be released as nitrogen gas to provide a nitrogen gas atmosphere in the cooling vessel. Preferably, some of the nitrogen gas is initially absorbed in the hot lumpy product, and during cooling, the gas emanates from the product, even during packaging.

Also according to the present invention, we provide apparatus for the continuous preservation of lumpy product comprising a drum in which the product is heat treated and means to feed the product to the drum, and to convey the product through the drum to an outlet for subsequent packaging aseptically, characterised in that the drum is stationary and has a conveyor therein and means to maintain liquid within the drum at a constant variable level, said conveyor being arranged to convey the product from a first location within the liquid to a second location above the liquid and being constructed so that liquid will drain off the conveyor when it is above the liquid and so that the conveyor will move through the liquid when it is within the liquid, sensing and control means to maintain the level of liquid at said constant level, a liquid outlet in the drum, through which excess liquid passes, means to pasteurise or sterilise said excess liquid, means to cool the excess liquid, and further means to feed said treated liquid and/or additional treated liquid, all under aseptic conditions, back to said drum.

Treatment of the lumpy product, e.g. food in lump form, according to the invention, is extremly gentle, both in the mechanical and in the thermal sense, but good rapid heat transfer, and hence a reliable germicidal effect, is achieved. In contrast to the known processes, very large pieces of product can be carefully treated.

With lumpy food product it has in the past always been very difficult to achieve in the final product a constant ratio between the lumpy solid portions and the liquid. Because it has not been possible to do this in a continuous manner using conventional process, the process has previously been carried out in a discontinuous way, each charge being adjusted individually to give the required or necessary ratio between the liquid and the solid components before filling a container with the product. With the invention, on the other hand, experts in the trade are provided for the first time with a continuous process with which it is possible to achieve a constant ratio between the solid and liquid components in the end product, i.e. both for hot and for cold filling of the end product.

The pressureless feeding of the blanched and pasteurised goods means first of all the elimination of pipelines and pumps, and hence, even at this early stage of the comprehensive method, an extremely careful treatment of the lumpy product.

It is preferred to use an inclined drum, to which liquid is passed separately from the lumpy product, under aseptic conditions, and which is kept at a pre-determined level inside the drum. This means that the blanched and pasteurised product is fed, without pressure, to an aseptic tank represented by the drum. The thermal treatment of the product takes place in this aseptic tank, "thermal treatment" meaning either heating or cooling.

The inclined position of the drum results in its being filled only partly with lumpy product and liquid, occupying preferably less than half of its volume. In the drum, a stationary state is maintained in which the smallest possible amount of liquid is transferred through to the most intensive stage of the whole process, in terms of energy, at the same time, however, ensuring the optimum heat transfer to the lumpy product since new areas of the lumpy product are continually coming into contact with the heating or cooling liquid but at the same time taking the maximum possible mechanical care of the product An important feature of the process according to the invention is that the lumpy product is continuously separated from the liquid while still inside the drum. This means that the lumps of product leave the drum with only the desired amount of liquid and can then be subjected to further heat treatment which may be pasteurisation, sterilisation or cooling, without an unnecessary amount of liquid being added, or can be filled into suitable containers under aseptic conditions and, if necessary, be continuously removed in the required ratio, with the liquid separated from the lumpy product and separately pasteurised or sterilised, if necessary already cooled. By this means, a constant ratio can be achieved between the solid and liquid fractions of the product in the final end product, with continuous process control, in an extremely simple manner and under aseptic conditions.

To separate the lumps of product from the liquid, a rotating motor-driven sieve insert inside the drum may be used. This sieve insert may be a perforated drum but may also be a type of cage made from rods arranged at regular intervals provided that the distance between them is so small that the lumpy product cannot fall through the gaps.

The inside cylindrical surface of the sieve insert has a spiral that forms an integral part with the cylindrical surface; the spiral may have perforations similar to those of a sieve, like the sieve insert itself.

The sieve insert inside the drum usually has a diameter of about 60-100cms and is about 1.5-3m long; it rotates very slowly inside the fixed outer drum at a speed of about 1:10rpm.

Due to the inclination of the drum, and hence also of the sieve insert rotating inside it, the lumpy food moves slowly through the turns of the spiral on the inside cylindrical surface of the sieve insert, from the lower feed end to the high discharge end of the drum.

Since the lumpy product and the liquid occupy only a small part of the space inside the drum, two or three spiral turns of the upper part of the sieve insert are still available through which the liquid from the lumpy goods can drain and can flow through the holes in the sieve insert or through the openings between the grill rods. By this means, the lumpy goods reach the transfer or exit end of the drum in a drained state; in the previous conventional process, the liquid fraction of the discharged goods represented about 20–40% by weight.

Other arrangements may be used in the drum to advance the lumpy product through the inclined drum, and to separate them from the liquid. Amongst these are an endless conveyor and various types of vibratory conveyors, with or without a fluidised bed type of suspension for the product.

A liquid of the same density as the lumpy goods to be treated is preferably used as the liquid which is circulated through the drum, the liquid acting as a heat transfer or cooling medium and as an acidifying medium, depending on the process control. In this way the lumpy product is freely suspended in the liquid, i.e. the pieces neither sink to the bottom nor float on the surface. The lumpy goods therefore receive very gentle treatment, and optimum heat transfer.

Instead of an isodense liquid, a liquid that is isotonic with the lumpy goods may be used, so that the advantages obtained due to equal density are enhanced by the fact that osmotic processes are suppressed.

Another preferred feature of the invention is to introduce steam, sterile air, or inert gas into the drum, thus maintaining a slightly positive pressure within the drum. The slightly positive pressure prevents the ingress of air or oxygen, and hence germs into the drum and also permits controlled atmosphere packaging of the lumpy product all under aseptic conditions. Alternatively, the treament in the drum of the lumpy product may be carried out under vacuum or reduced pressure. Usually, however the treatment process is carried out at normal pressure or, for maintaining aseptic conditions, under slight positive pressure.

Normally, if there is a pressure differential between the inside of the drum and the atmosphere, there is a need for pressure compensation valve means at the drum inlet and outlets. These may be in the form of rotating sluice valves, transfer pumps or transfer star valves. It is preferred, however, that a siphon type chute or pipe is provided at the inlet, the siphon being maintained by syrup or other liquid in the chute or pipe, the levels of the liquid being determined by the pressure differential between the inside and the outside of the drum.

According to another preferred feature of the invention, the blanched and pasteurised lumpy goods are de-aerated before they are fed to the drum, thus freeing them from cellular air and dissolved oxygen.

The liquid which is separated from the lumpy product, passes out of the drum and into a circuit and after re-pasteurisation or sterilisation by heat or filtering or microwave or other known methods, is fed back into the drum again under aseptic conditions. Alternatively, or additionally, separate circuits of varius liquids may be used, so that for the treatment in the drum (blanching, pasteurisation, sterilisation, cooling, acidification, enzyme treatment, etc.), liquids such as water, a salt solution or a syrup, for example, may be used while a sauce or juice may be added during a subsequent packaging or filling step. This means that the process of the invention has almost universal application.

The lumpy product in the drum can be sprayed with the pasteurised or sterilised liquid, all under aseptic conditions, and/or the liquid can be introduced into the drum in the form of a counter-current flowing against the passage of lumpy product through the drum, i.e. by injecting liquid into the drum at its downstream end. Spraying of the lumpy products in the drum is preferred because this results in heating or cooling of the lumpy product, depending on whether hot or cold liquid is used.

It is preferred that the process is performed in the acid range because pathogens cannot propagate in this range while, on the other hand, moulds and yeasts are destroyed at the blanching and sterilising station. If necessary, therefore, the liquid is preferably adjusted to a pH 4.5. The pH value may be adjusted in the conventional manner with the aid of physiologically harmless acids permitted by the food regulations. Glucono delta lactone and other lactone compounds or ascorbic acid, citric acid, sulphurous acid, or acid phosphates are particularly suitable substances for this purpose since they also serve as antioxidants at the same time and prevent a brown discoloration.

The process of the invention can be used for the blanching and/or pasteurisation and/or sterilisation and/or aseptic cold filling of lumpy product, e.g. after it has been heat treated. Sterilisation is usually carried out at temperatures between 100° and 140° C. and/or under increased pressure of up to $5 \cdot 10^5$ Pa). Alternatively, lumpy products may be passed continuously, in sequence, through several of the drums of the invention, and are thereby subjected to various heat and/or other treatments all or some of which are in accordance with the invention. In this case, the first drum can be designed as a blanching station, another drum as a sterilisation station, and a third drum as a cooling station. Furthermore, one or more processes according to the invention can be combined with conventional processes, such as acidification, colouring, flavouring or enzyme treatment, and conventional devices, but it must of course be ensured that the advantages acquired from the invention are not offset by the disadvantages of the conventional processes and devices, or even over-compensated.

The liquid which is used for heat treatment in the drum and/or elsewhere in the process of the invention is continuously drawn off from the drum and replenished with fresh aseptic liquid, so as to maintain a constant, but variable, liquid level in the drum. The drawn off liquid may be sterilised in known manner, or for example, using micro-filters, and if desired may be topped up with fresh sterile liquid. In one embodiment of the invention, the liquid is used for cooling the lumpy product, and after sterilisation, it will be hot, and must be cooled. While this can be achieved using known means, it is preferred to use liquid nitrogen for this purpose. Preferably, therefore, the hot liquid is cooled in a plate heat exchanger using liquid nitrogen, and the liquid nitrogen is converted by the hot liquid into cold gas, which is then injected into the warm liquid upstream of the heat exchanger, serving both to de-aerate the liquid (it will have absorbed oxygen from the lumpy product) and to cool it further. This nitrogen rich cooled liquid is then recirculated back into the process, and is preferably passed into the stream of hot lumpy product, where the product is being introduced into the treatment drum. At this point, the lumpy product is oxygen rich, and the cold nitrogen rich liquid will shock cool the product, and also de-aerate the product. The heat of the product will tend to release gaseous nitrogen from the nitrogen rich cold liquid which is washed into the drum with the lumpy product, thus resulting in the space above the treatment liquid in the drum being filled with gaseous nitrogen, i.e. a controlled atmosphere at a slightly elevated pressure is provided. This means that it is virtually impossible for air to seep into the drum thus maintaining asepticity. Furthermore, it means that nitrogen rich gas exits from the drum with the lumpy product thus helping to maintain asepticity during a filling operation.

It should be appreciated that other inert gases may be introduced into the drum or for that matter just steam or even negative pressure can be used. For this purpose, pressure regulating means is provided to control the atmosphere within the drum.

Figure 2:
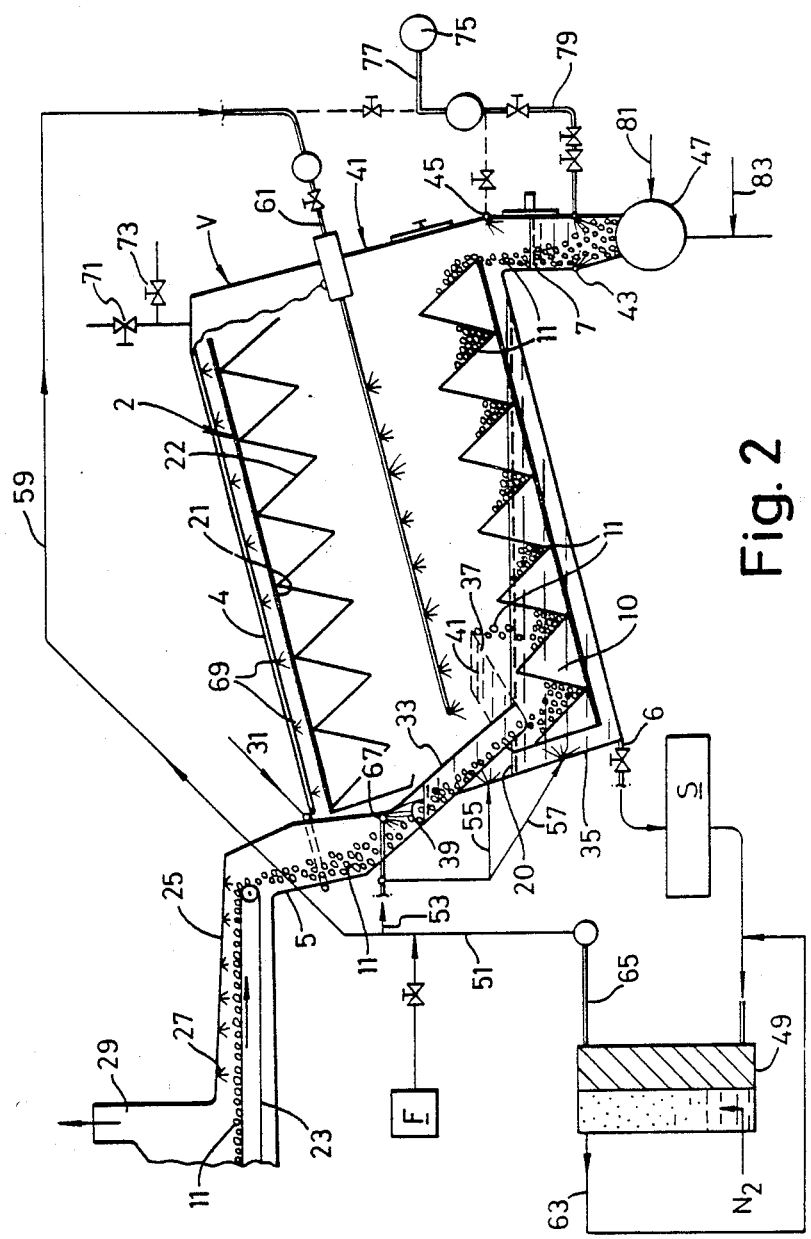

Two embodiments of process and apparatus for cooling lumpy food product which has previously been heat treated and which is subsequently packed, all under aseptic conditions, are now described by way of example with reference to the accompanying partly schematic drawings, in which:

FIG. 1 is partly a flow diagram of the process and partly a diagrammatic illustration of the apparatus of a first embodiment, and in which FIG. 2 is a similar view of a second embodiment.

Each of the embodiments described with reference to the drawings is for the continuous processing and preservation of lumpy food product L and the apparatus illustrated is for the final stage in the aseptic processing of the food product subsequent to one or more heating stages and showing schematically a final packaging stage. While it is important that packaging should be completed aseptically, it will be appreciated that any type of aseptic packaging method or equipment could be used but it is preferred that the filling apparatus be such as that disclosed in the specifiction of our U.K. Patent Application No. 8724413 or of our U.K. Patent Application No. 8801098 and that it incorporates a filling head and/or liner bag such as disclosed in the specification of our U.K. Patent Application No. 8801413. Alternatively, the filling apparatus could be of the type disclosed in our U.K. Application No. 8727582 or EP-A-0212201.

Referring now to FIG. 1, the lumpy food product L to be treated is first continuously fed into a blanching and pasteurisation station and/or sterilisation station 1 with the aid of conventional conveyors (not illustrated). The station 1 may incorporate conventional blanching, pasteurising and sterilising apparatus, preferably using steam, or, alternatively, may be apparatus according to the present invention and incorporating a treatment drum and associated equipment such as the drum 4 to be described. The heat treated lumpy food product is passed from the station 1 via a chute 5 into a sieve insert 2 which is rotated about its longitudinal axis A inside a stationary inclined drum 4. The chute 5 extends through the end wall of the drum 4 to introduce the product L into a liquid 10 within the drum 4 (discharged either above or below the liquid level), under gravity, but normally there would be a pressure differential between the inside of the drum 4 and the atmosphere, in which case some form of pressure compensating means in the inlet of the drum 4 would be necessary, such as a transfer star wheel valve or pump.

The liquid 10 within the drum 4 is maintained at a constant level 20 by suitable control valves and is taken from a reservoir 3 which is connected to a conventional steriliser S. After sterilisation it is cooled in a cooler 13 and passed continuously via lines 14 and 15 under aseptic conditions to the drum 4. There may be a further feed line (not shown) to the chute 5. The sieve insert 2 which rotates continuously slowly about the axis A is in the form of a rotary cylindrical screen carrying on its inside cylindrical surface 21 a spiral 22 which rotates with the cylindrical surface 21 and is perforated in a similar manner to the surface 21. The lumps of food product 11 which are introduced into the drum at 5 are first cooled in the liquid 10 which is chosen so as to have the same density as the lumps of food 11 and are then conveyed through the liquid 10 slowly by the spiral conveyor 22 from the lower end of the drum out of the liquid 10, the depth of which gradually decreases, to the upper discharge end of the drum which is located above the liquid level 20. In the upper part of the rotary screen 21 the lumps of food L are continuously being separated from the liquid 10 which of course continuously flows through the apertures in the screen and spiral conveyor. Any liquid remaining on the lumps of food 11 in the upper part of the screen can drain off the food and through the screen and its spiral conveyor back into the pool of liquid 10 in the lower part of the drum 4. The dwell time of the lumps of food 11 within the drum 4 and in the liquid 10 can be adjusted as required by varying the rotary speed of the sieve insert 2 and/or by changing the slope of the drum and/or by regulating the level 20 of the liquid.

At the upper end of the drum 4 a discharge sluice or outlet opening 7 is provided. The cooled lumps of food 11 without any appreciable amount of liquid are discharged from the drum 4 through the sluice 7 where they pass to a packaging station 17 all under aseptic conditions. The drained lumps of food 11 can be handled at the packaging station 17 by conventional aseptic packaging methods but it is preferred that they are placed into bag-in-box type containers using filling apparatus incorporating a ball valve such as is disclosed in our U.K. Patent Application No. 8724413 or apparatus for excluding head space gases as disclosed in our U.K. Patent Application No. 8801098. Preferably, the filling head/bag spout construction is as disclosed in our U.K. Patent Application No. 8801413. Filling can be carried out either without the addition of any further liquid or by the addition of appropriate syrup or sauce through a filling line 16 connected by a valve (not shown) to the liquid supply line 14 or, if a different liquid from that in reservoir 3 is required, from another liquid supply. Filling can be undertaken under controlled atmospheric conditions; for example, filling could occur in a nitrogen rich atmosphere so as to exclude air from the final container and/or a negative pressure system can be used.

Steam D or inert gas (which may be the same or different from that used for the controlled atmospheric packaging) can also be fed into the drum 4, thus at all times maintaining a slight positive pressure inside the drum in order to prevent entry into the drum of air and hence germs and the like.

Excess liquid 10 can be removed from the drum through a discharge valve 6 under the control of heat and/or level sensors and be passed via a line 12 into the storage vessel 3 for subsequent re-sterilisation.

Referring now to the embodiment shown in FIG. 2, lumpy food product 11 is fed from a heat treatment station (not shown) on an endless conveyor belt 23 through a closed feed tunnel 25 into a feed chute 5, a slightly positive pressure being maintained at all times within the tunnel 25 by steam jets 27 in the roof of the tunnel which also maintain aseptcity. Excess steam, air and other gases are allowed to escape from the tunnel 25 through a chimney 29. The lumps of food 11 slide down the chute 5, through an annular curtain of steam 32 into the top of a siphonic filler 33 extending through an end wall 35 of a cooling vessel V in the form of an inclined drum 4. The lower end of the siphonic filler 33 extends just below the surface 20 of cooling liquid 10 located in the drum 4 and as shown at 37 is then upturned so as always to maintain a column of liquid within the filler, to act as a seal between the interior of the drum 4 and external steam atmosphere. If the pressure within the drum 4 is the same as atmospheric pressure then the column of liquid within the filler 33 will each be located at the level of discharge from the upturned portion 37 of the filler 33, but it is preferred that a slightly positive pressure be maintained within the drum 4, in which case the liquid levels would be arranged, e.g. as illustrated at 39 and 41. The higher the pressure within drum 4, the higher the level 39 will become. The upturned end 37 of the filler 33 is shown in broken lines because it may have alternative constructions but it need not be provided at all. Instead, filler 33 could be a simple funnel extending just into the drum 4, or just below the liquid level 20. It should also be appreciated that alternative means may be provided for introducing lumpy product into the vessel V, as in the previous embodiment.

A spiral conveyor 22 is provided to move lumpy product in a gentle fashion within the drum 4 from the filler 33 to a discharge channel 7 at the opposite end 41. This may either be of the same general construction described with reference to FIG. 1 with perforated cylindrical sleeve 2 having one or more spiral flights attached to and rotatable with the sieve insert, or may be of other known construction. As in the previous embodiment, the hot lumps of food 11 are cooled by the liquid 10 and as they move towards the upper end 41 of the drum 4, they are separated from the liquid by the conveyor 22 and they are then allowed to drop under gravity into the discharge channel 7. At the upper end of the drum once they have been lifted out of the liquid 10, excess liquid can drain off through the apertures in the conveyor 22 as in the previous embodiment.

The largely dry lumps of food 11 have their passage through the channel 7 eased by an annular liquid spray 43, this liquid either being the same as the liquid 10 or a different liquid as desired. A further jetting spray 45 at the upper end of the channel 7 is provided to "jet out" any blockage caused by lumps of food 11 in the channel 7.

As previously indicated, the illustrated apparatus is for cooling previously heat treated lumps of food 11 prior to their being aseptically packaged at the downstream end of the channel 7, as indicated generally at 47. Obviously, the hot lumps of food 11 where they enter the drum 4 will cause the liquid 10 therein to heat up and it is necessary, therefore, continuously to recirculate and re-sterilise this liquid, topping it up as necessary from a fresh supply F of aseptic liquid. The level 20 of liquid 10 is maintained automatically at the desired height and warm cooling liquid from the drum 4 is discharged through an aperture 6 in the base of the drum where it is sterilised at a sterilising station S and then cooled in a plate heat exchanger 49 with liquid nitrogen. The cooled liquid exits from the heat exchanger 49 through a line 51 and is then passed back into the drum 4 through any one or more of the lines 53, 55, 57, 59 or 61. The liquid nitrogen in the heat exchanger 49 is converted by the heat of the sterilised liquid into nitrogen gas which is then taken from the heat exchanger, through a line 63, and injected into the hot liquid shortly before the liquid passes into the heat exchanger, at 65. Because the liquid is now cold, the nitrogen gas is absorbed well and it is preferred that the cooled nitrogen gas rich liquid is introduced through the line 53 into the filler 33 in the form of a cold liquid spray 67. This cold spray will have the effect of shock cooling the hot lumps of food 11 and will pass with the lumps of food into the drum 4 where further cooling occurs. At the same time as the lumps of food are being cooled, so the heat from these lumps will convert some of the nitrogen in the cold liquid into gaseous nitrogen which will be released into the space in the drum 4 above the liquid 10, thus providing a slightly positive pressure of nitrogen gas therein and ensuring ingress of air and germs into the drum does not occur. The pressure of this nitrogen gas will also control the liquid level 39 in the filler 33. Furthermore, the nitrogen gas rich liquid where it is sprayed at 67 onto the lumps of food entering the drum 4 will also tend to de-aerate the lumps 11, thus helping to preserve the lumps. Accordingly, the liquid nitrogen used initally to cool the hot sterilised liquid 10 has the secondary functions of de-aerating the liquid and the lumps of food 11 and of creating an inert atmosphere in the drum 4. This inert atmosphere can also be used for the controlled atmospheric packaging of the product at the outlet of the discharge channel 7. It will of course be appreciated that there are alternative ways of cooling the liquid 10, and re-introducing it into the vessel V, and of controlling the content of the space above the liquid 10 in the drum 4.

In order to maintain asepticity at all times, steam may be sprayed into the top of the drum at 69 under the control of a pressure regulator 71. Alternatively, a different gas may be sprayed in under the control of a gas valve 73; this gas could of course be nitrogen taken from the gas line 63 or another inert gas.

At the outlet end of the discharge channel 7 where aseptic packaging occurs at 47, pressure compensating and/or gas evacuation means and/or controlled atmosphere packaging means must be provided. This could be in the form of a standard transfer valve or pump or a filler valve which may be equipped with a sterile gas filling facility, and/or a negative pressure facility for evacuating gas after filling, and/or with a filling head co-operating with a filling spout so as to allow gas discharge during filling. The filler valve preferably also has means for providing a steam barrier for aseptic reasons and a steam jet at its outlet side, and may be such as is disclosed in one or more of our above-mentioned U.K. Patent Applications. Alternatively or additionally, an atmospheric compensation system can be used upstream of the filler valve, in which the internal pressure within the drum and upstream of the filling head would be connected by an inverted U-shaped pipe, incorporating a column of liquid therein, to a negative atmospheric sterile chamber at its outlet side, all largely in known manner. Any air passing with the lumps of food 11 would be evacuated through the compensating pipe and would be pulled into the negative pressure chamber, but any liquid that might accummulate could not rise more than the liquid column height which would be created in the U-shaped pipe and which would correspond with the internal pressure within the drum 4.

As with the embodiment of FIG. 1, the slope of the drum 4 and hence also of the sieve insert 2 can be adjusted from about 5° to about 30° with respect to the horizontal.

Both embodiments of the invention can have their fluid levels, gas pressures and all their various control sequences monitored, regulated and controlled completely automatically using either conventional devices or a control system such as is disclosed in EP-GB-0180540.

Although the lumps of food 11 in the outlet channel 7 could be placed aseptically in a large open-topped container in accordance with the teachings of our U.K. Patent Application No.8727582, it is preferred that they are placed in a narrow necked liner bag which is locatable in a box or drum using a filling head and bag-spout construction fitted with gas venting facilities such as disclosed in our U.K. Patent Specification No. 8801413, and using filling equipment which incorporates at least some of the features disclosed in either U.K. Patent Application No. 8724413 or U.K. Patent Application No. 8801098 or EP-A-0212201.

In a yet further alternative, the lumpy food product could be fed directly into a bulk food container, such as a tanker wagon or storage tank.

In any event, it is important that completely sterile aseptic conditions are maintained during a filling operation whether this be filling the container with a largely dry product or product mixed with the appropriate syrup or sauce, just upstream of the filling apparatus, or whether it be a product to which a different liquid is added by means of a proportional dosing system, such as for example lumps of potato with tomato sauce, or asparagus with mayonnaise, or potatoes with a meat sauce. When this proportional dosing system is used, the special liquid is introduced into the filling channel 7 from a supply 75 (see FIG. 2) through a branch pipe 77 and the liquid line 79.

Whatever filling apparatus is used at the filling station 47, it is important to be able to supply steam, and/or inert gas, and/or a vacuum to the filling head, e.g. through a gas line 81 and to supply an inert gas and/or steam, and/or a vacuum downstream of the filling head (or through the filling head) for injecting into the container being filled (or to evacuate head space gas therefrom) by filling, e.g. through a line 83. The provision of the line 83 for supplying inert gas such as $CO_2$ is particularly advantageous when filling previously evacuated liner bags with lumpy food product because it is almost impossible to introduce such product into the collapsed bag and hence the inert gas is first injected into the bag to inflate it, thus maintaining its asepticity, whereupon the gas is displaced from the bag by the product. Any residue of inert gas or other gas for that matter in the head of the bag can then be drawn out of the bag by connecting the top of the bag to a source of vacuum in the line 83 or 81, e.g. by a method such as disclosed in one of our above identified patent applications, prior to capping the bag. Using this system, heavy pastes and semi-dried products can easily be placed within the liner bags. It is particularly advantageous to have filling apparatus incorporating a ball valve as disclosed in our U.K. Patent Application No. 8724413 since a ball valve can be used for filling lumpy food product incorporating highly viscous sauces or almost dry product. Furthermore, it is simple to incorporate a vacuum line, e.g. connected to or in place of the line 83, on the outlet side of the ball valve, so as to draw out any unwanted gas from the top of the full bag prior to capping the bag.

To maintain asepticity, it is important to achieve airless filling or evacuation of the final package and because of the normal positive pressure within the drum 4 it is inevitable that a certain amount of air will be transferred into the final package together with the liquid and lumpy food product and hence there should be a facility to flush out the top of the bag with inert gas and/or with steam and/or to evacuate the head space in the bag using the system mentioned above or one of the other processes described above and/or in one or more of the above referred to patent applications.

Instead of maintaining the liquid 10 sterile by a heating process in the chamber S and then cooling it in the heat exchanger 49, it would be possible to sterilise it by using a microfiltration system which does not require the considerable heat for the sterilising chamber S. Instead, the liquid has to be cooled from only a little above atmospheric temperature and this has the advantage that because the liquid does not need to be repeatedly re-heated, its quality can be preserved.

The two above-described embodiments of the invention are particularly designed for cooling lumpy food products after they have been subjected to one or more heat processing steps. It will be appreciated, however, that the drum 4 together with the sieve insert and spiral conveyor 2, 22, or any other type of conveyor together with its associated steam sprays, feed means and discharge means and liquid level control equipment and of course the means for rotating the sieve insert and conveyor (if such is provided) could be used for one or more of the heat treatment processes. In this case of course cooling liquid would not be introduced into the drum at all but instead, the liquid 10 would be maintained at the necessary treatment temperature while the lumpy food product is gently advanced from the inlet end to the outlet end of the drum 4. This heat treatment vessel could then discharge into a further heat treatment vessel of the same or different type, whereupon the heat treated lumpy product could then be cooled using the apparatus and method described with reference to the drawings or perhaps using alternative apparatus. It would, however, be imperative that asepticity be maintained at all times and that whatever process is used it is a gentle process which maintains the integrity of the lumpy products.

It will of course be understood that the present invention has been described above purely by way of example, and modifications of detail can be made within the scope of the invention. For example, features described with reference to the embodiment of FIG. 1 can be used with and/or instead of features described with reference to the embodiment of FIG. 2, and vice-versa.

What is claimed is:

1. A method for the continuous preservation of lumpy product comprising:
   feeding said lumpy product without pressure and under aseptic conditions into a drum;
   maintaining said drum partially filled with a liquid at a constant, adjustable level, and a selected temperature, said liquid being selected to ensure that the lumpy product remains suspended in said liquid for ensuring overall heat treatment; subjecting said lumpy product to heat treatment from said liquid;
   continuously conveying said lumpy product upwardly through said liquid;

separating said lumpy product from said liquid;

passing said lumpy product to a product outlet in said drum for subsequent packaging; and continuously taking excess liquid in said drum from said drum, pasteurising or sterilising said excess liquid, and passing said excess liquid back into said drum under aseptic conditions.

2. A method according to claim 1 wherein a liquid of the same density as said lumpy product is used.

3. A method according to claim 1 wherein said liquid is isotonic with said lumpy product.

4. A method according to claim 1 including the step of passing steam or inert gas into said drum and maintaining the interior of said drum at a positive pressure relative to atmospheric pressure.

5. A method according to claim 1 including maintaining the interior of said drum at reduced pressure relative to atmospheric pressure.

6. A method according to claim 1 including the steps of blanching and sterilising said lumpy product and then de-aerating said lumpy product so that it is freed from cellular air and dissolved oxygen prior to entry into said drum.

7. A method according to claim 1 including feeding said liquid, which has been separated from said lumpy product and removed from said drum, into a circuit, and re-pasteurising or re-sterilising said liquid in said circuit and then cooling said liquid in a heat exchanger using liquid nitrogen, whereby the heat from said liquid converts said liquid nitrogen into gaseous nitrogen, and then injecting said gaseous nitrogen into the liquid, and then returning the cooled liquid to said drum under aseptic conditions, whereby said lumpy product then releases nitrogen from said liquid so as to provide nitrogen gas in said drum above said liquid.

8. A method according to claim 1 including spraying said lumpy product with said pasteurised or sterilised liquid, and then passing said lumpy product under aseptic conditions, into said drum.

9. A method according to claim 1 including providing a sieve insert;

rotating said sieve insert inside said drum for separating said lumpy product from said liquid; and inclining said drum so that its longitudinal axis about which it rotates forms an acute angle with the horizontal.

10. A method according to claim 1 including the step of adjusting the pH value of said liquid to $\leq 4.5$.

11. A method according to claim 1 including heating said lumpy product and then cooling said lumpy product in said drum under aseptic conditions, and including the step of cooling said liquid prior to passing said liquid into said drum.

12. A method according to claim 1 including the steps of passing said lumpy product continuously, in succession, through several drums.

13. Apparatus for the continuous preservation of lumpy product comprising:

a stationary drum having an inlet and an outlet and in which said product is to be heat treated at substantially atmospheric pressure;

means to maintain a liquid at a required temperature and at a constant variable level within said drum;

means aseptically to feed said product to said drum through said inlet;

conveyor means to convey said product in a state of suspension upwardly through said liquid to said outlet for subsequent packaging aseptically;

said conveyor means being arranged to convey said product from a first location adjacent said inlet and within the liquid to a second location spaced from said first location and above said liquid;

drainage aperture means being provided on said conveyor so that liquid will drain off said conveyor when said conveyor is above said liquid and so that conveyor will move through said liquid when it is within said liquid; and sensing and control means to maintain said liquid at said constant level; a liquid outlet in said drum, through which said excess liquid passes; means to pasteurise or sterilise said excess liquid; and means to cool said excess liquid; and further means to feed a treated liquid, under aseptic conditions, back to said drum.

14. Apparatus according to claim 13 wherein said drum is an inclined drum and including a rotary sieve insert within said drum and means to rotate said sieve insert, said insert having an internal cylindrical surface and including a spiral that forms an integral part of said surface on said surface.

15. Apparatus according to claim 14 including means to adjust the slope of said drum from about 5° C. to about 30° with respect to the horizontal.

16. Apparatus according to claim 14 including, at a bottom end area of said drum, a feed chute for said lumpy product and said liquid outlet for removing said excess liquid, and, in an upper end area of said drum, where said lumpy product is separated from said liquid, a product outlet and an inlet for said aseptic liquid that has been pasteurised or sterilised and an inlet for steam or inert gas.

17. Apparatus according to claim 16 wherein pressure compensating means are provided at said feed chute and said product outlet.

18. A method of cooling excess liquid for use in the method of claim 1 comprising:

feeding said liquid to a plate heat exchanger;

feeding liquid nitrogen to said plate heat exchanger, whereby said liquid nitrogen is converted by the heat of said liquid into nitrogen gas;

injecting said nitrogen gas into said liquid, so that it is partially absorbed by said liquid;

feeding the cooled liquid from said heat exchanger into a cooling vessel for cooling lumpy product passing through, or within, said vessel; and causing the nitrogen in said liquid to be released as a gas to provide a nitrogen gas atmosphere within said cooling vessel to enable the cooled product subsequently to be packed in the presence of said gas.

19. The apparatus of claim 14 comprising:

a plate heat exchanger;

means for feeding liquid to said plate heat exchanger;

means for feeding liquid nitrogen to said plate heat exchanger, whereby said liquid nitrogen is converted by the heat of said liquid into nitrogen gas;

means for injecting said nitrogen gas into said liquid, so that it is partially absorbed by said liquid;

a cooling vessel; and means for feeding the cooled liquid from said exchanger into said cooling vessel for cooling lumpy product passing through, or within, said vessel, and using heat from said lumpy product to be cooled to cause the nitrogen in said liquid to be released as a gas to provide a nitrogen gas atmosphere within said cooling vessel to enable the cooled product subsequently to be packed in the presence of said gas.

* * * * *